US008698643B2

(12) United States Patent
Schmitt et al.

(10) Patent No.: US 8,698,643 B2
(45) Date of Patent: Apr. 15, 2014

(54) SENSOR ELEMENT, IN PARTICULAR SEAT OCCUPANCY DETECTION SENSOR ELEMENT

(71) Applicants: SCHERDEL INNOTEC Forschungs- und Entwicklungs-GmbH, Marktredwitz (DE); Forschungs- und Transferzentrum Leipzig e.V. an der HTWK Leipzig, Leipzig (DE)

(72) Inventors: Marco Schmitt, Kulmbach (DE); Jan Seitenglanz, Marienberg (DE); Thomas Fiedler, Grossrueckerswalde-Mauersberg (DE); Gisela Barthold, Hohenberg (DE); Hans-Martin Rambold, Marktredwitz (DE); Fabian Wiessner, Leipzig (DE); Michael Eiserbeck, Leipzig (DE)

(73) Assignees: SCHERDEL INNOTEC Forschungs-und Entwicklungs-GmbH, Marktredwitz (DE); Forschungs-und Transferzentrum Leipzig e.V. and der HTWK Leipzig, Leipzig (DE)

( * ) Notice: Subject to any disclaimer, the term of this patent is extended or adjusted under 35 U.S.C. 154(b) by 0 days.

(21) Appl. No.: 13/659,560

(22) Filed: Oct. 24, 2012

(65) Prior Publication Data
US 2013/0119728 A1 May 16, 2013

(30) Foreign Application Priority Data
Oct. 26, 2011 (DE) .......................... 10 2011 085 263

(51) Int. Cl.
B60K 28/00 (2006.01)
G08B 21/00 (2006.01)

(52) U.S. Cl.
USPC ........................................... 340/667; 180/273

(58) Field of Classification Search
USPC .............. 73/862.473; 180/273; 340/665–668, 340/425.5; 702/150, 173
See application file for complete search history.

(56) References Cited

U.S. PATENT DOCUMENTS
2004/0263154 A1 12/2004 Young et al.

FOREIGN PATENT DOCUMENTS
DE 19959276 A1 6/2001
DE 102004031143 4/2005

OTHER PUBLICATIONS
English Language Abstract of DE19959276 (A1), 1 page.

Primary Examiner — Brian Zimmerman
Assistant Examiner — Thomas McCormack

(57) ABSTRACT

Seat-occupancy-detection-sensor-element featuring double-body/compression/spring (DBCS) in a recess of a base-member (BM); and slidable-member (SM) having a force-application-side (FAS) and inside facing the BM; measuring-coil (MC) arranged in the recess and surrounded by the DBCS and having wound-coil-wire (WCW); and current-generating/measuring/evaluating-unit (CGMEU) connected to the WCW; the DBCW abutting the BM on one side and being fixed to the SM on the side of the SM compressed by a force on the FAS, from a spring length either uncompressed or compressed by a predetermined extent; spring wire ends connected and electrically forming a spring-coil (SC); MC and SC coils constituting an inductively-coupled coil assembly (ICCA); and the CGMEU applying AC to the MC inducing AC in the DBCS, measuring voltage on the MC proportional to the ICCA's impedance, and ascertaining force on the SM's FAS.

19 Claims, 5 Drawing Sheets

SENSOR ELEMENT, IN PARTICULAR SEAT OCCUPANCY DETECTION SENSOR ELEMENT

CROSS-REFERENCE TO RELATED APPLICATION

This application claims benefit under 35 U.S.C. §119 to German patent application serial no. DE 10 2011 085 263.8, filed 26 Oct. 2011, entitled "Sensor element, in particular seat occupancy detection sensor element," which is hereby incorporated by reference in its entirety.

TECHNICAL FIELD

The present invention relates to a sensor element, in particular a seat occupancy detection sensor element, an assembly of two such sensor elements, a spring mat provided therewith, a substructure for a seat provided therewith as well as seat provided therewith.

Seats, in particular vehicle seats for motor vehicles, apart from fulfilling comfort aspects, such as a good supporting effect, sufficient freedom of movement, pleasant seat temperature as well as good vibration and damping behavior, often have to be capable as well to reliably detect the occupancy of the seat.

BACKGROUND ART

Document DE 199 59 276 A1 reveals a device and a test method for seat occupancy detection for vehicle seats as a prerequisite for intelligent restraint systems with personal classification and matched actuation strategy for belt tensioners, belt force limiters and airbags. This device has as basis a thin flexible supporting structure, e.g. a plastics film or a matrix of plastics strips, that is placed immediately below the entire seat area and closely adapts to the seat contour. Integrated in the supporting structure are a plurality of flat pressure sensors, one or more flat data storages, one or more flat transponders as well as an autonomous voltage source. The data pattern ascertained represents the kind and strength of the seat occupancy as well as the seat pressure profile.

Such a device is very expensive as already the required components are very expensive and moreover the installation on the seat foam or the seat cover is labor and cost intensive. Moreover, such a device is sensitive and prone to error.

OBJECT OF THE INVENTION

It is thus an object of the invention to indicate a sensor element by which an acting force can be ascertained exactly and reliably while said sensor element at the same time can be produced at low costs and is robust in addition. In particular, there is to be indicated a seat occupancy detection sensor element which is capable of exactly and reliably detecting the occupancy of a seat and/or the weight force of a person sitting on a seat, and at the same time permits manufacture and installation of the same at low costs and moreover is of robust character. In addition thereto, there are to be indicated an assembly comprising such sensor elements, a spring mat for a seat, a substructure for a seat as well as a seat, which also realize the afore-mentioned advantages.

This object is met by the subject matter of the independent claims, with advantageous further developments being indicated in the dependent claims.

SUMMARY OF THE INVENTION

A sensor element according to the invention, in particular a seat occupancy detection sensor element comprises a double-body compression spring; a base member having a substantially cylindrical recess for receiving the double-body compression spring; and a slidable member having a force application side and an inside facing the base member; a measuring coil arranged in the substantially cylindrical recess and surrounded by the double-body compression spring and having a wound coil wire; and a current generating, measuring and evaluating unit connected to the wound coil wire of the measuring coil; wherein the double-body compression spring abuts the base member with its first end on the side of the base member and is fixed to the slidable member with its second end on the side of the slidable member and is adapted to be compressed, by a force acting on the force application side of the slidable member, from an initial state in which the double-body compression spring has an uncompressed initial spring length or an initial spring length compressed by a predetermined extent, into a compressed state of shorter spring length; wherein the spring wire ends of the double-body compression spring are connected to each other in electrically conducting manner so as to form a spring coil; wherein the measuring coil and the spring coil constitute an inductively coupled coil assembly; and wherein the current generating, measuring and evaluating unit is designed such that it applies a defined alternating current to the measuring coil so that an alternating current is induced in the double-body compression spring, that it measures the voltage on the measuring coil that is proportional to the overall impedance of the inductively coupled coil assembly and ascertains from said overall impedance the force acting on the force application side of the slidable member.

According to the invention, force measurement takes place using a compression spring which—in addition to taking up the mechanical force in axial direction and storing said force—acts electrically as a coil and thus constitutes a spring coil and the inductance of which changes with the spring length in conformity with the load. This is utilized for electric evaluation.

According to the invention, the spring coil used is a double-body spring comprising in particular two springs arranged within each other and electrically connected in series and short-circuited on one side to a further connection.

Due to the inductive coupling of the spring coil with an additional measuring coil, the difficulty in establishing contact with the spring ends can be avoided.

The measuring coil and the spring coil of the inductively coupled coil assembly are connected by the common flow and constitute a short-circuited transformer.

The impedance can be increased with the winding ratio, which is limited by incomplete coupling.

The sensor element according to the invention is suitable for arbitrary applications in which an acting or applied force has to be reliably determined and in which a simple, compact and robust construction and inexpensive manufacture are demanded at the same time.

A sensor element according to the invention has a simple and compact construction and can thus be manufactured in simple and inexpensive manner, and is robust and has a very high durability.

Due to the simple and compact construction as well as the simple function of the seat occupancy detection sensor element according to the invention, the force acting on the force application side of the slidable member can be ascertained exactly and as often as desired, without there being notable losses in accuracy.

The sensor element according to the invention is particularly suitable as seat occupancy detection sensor element for detecting a person sitting on a seat, in particular a vehicle seat, and for determining the weight force applied by this person onto the seat. With a seat occupancy detection sensor element, the base portion is intended to be secured to a seat, in particular a spring mat of a seat.

Besides, a seat occupancy detection sensor element according to the invention is very durable and, in comparison with other seat occupancy detection devices is less expensive and less prone to failure.

A sensor element according to the invention is adapted to reliably and precisely determine whether a force acts on the force application side of the slidable member and, accordingly, whether the double-body compression spring is compressed from an initial state, in which the double-body compression spring has an uncompressed initial spring length or an initial spring length that is compressed by a predetermined extent, to a compressed state in which the double-body compression spring has a smaller spring length that results due to the magnitude of the force applied. In this context, the term "compressed state" is to be understood as an arbitrary compressed state resulting from the reduced spring length due to the magnitude of the force applied.

This determination is made by the current generating, measuring and evaluating unit that applies a defined alternating current to the measuring coil so that an alternating current is induced in the double-body compression spring, so that it measures the voltage at the measuring coil that is proportional to the overall impedance of the inductively coupled coil assembly, and ascertains the force acting on the force application side of the slidable member from the overall impedance.

According to a basic idea of the inventors, the seat occupancy detection sensor element according to the invention makes use of the principle of inductive coupling.

The inductance of the measuring coil is defined as $L=n^2 \times D^2/l$, in which n is the number of windings, D is the inner diameter and l is the length of the coil.

The double-body compression spring, the spring wire ends of which are connected to each other in electrically conductive manner, constitutes an electric circuit in which, by application of the defined alternating current to the measuring coil, an alternating current is induced effecting induction in the measuring coil. The inventors have found out that this induction, which is due to the alternating current flowing in the double-body compression spring, is dependent on the length of the double-body compression spring.

The overall impedance thus resulting from the alternating current flow in the measuring coil and the alternating current flow induced in the double-body compression spring, i.e. the ratio of electric voltage at the measuring coil to the current input, can be ascertained by the current generating, measuring and evaluating unit connected to the measuring coil, in particular to the ends of the current conducting line of the measuring coil. The impedance is the higher the shorter the spring coil, and the lower the longer the spring coil. The impedance thus is inversely proportional to the spring coil length.

In accordance with another basic idea of the invention, the windings of the double-body compression spring are used in the manner of a transformer, as a second coil/second inductance in addition to the windings of the measuring coil, and by way of a change of the alternating current flow induced in the double-body compression spring in case of changes in length of the double-body compression spring, the overall magnetic field and the overall impedance, due to the alternating current flow in the measuring coil and from the alternating current flow induced in the compression spring, are changed as well.

The voltage at the measuring coil is measured, and the overall impedance as well as the force applied can be ascertained therefrom.

The inventors have found out that the inductance of the compression spring used in the seat occupancy detection sensor element has to be of such magnitude that the changes to this inductance are sufficient to permit reliable measurement and processing of the same and that, in case of use of a double-body compression spring having an inductance that is higher approx. by a factor below 4, in particular by the factor 3, as compared to single springs, the inductance is of sufficient magnitude to allow the changes in inductance to be precisely measured, processed and associated with forces applied accordingly.

When a double-body compression spring is used, the alternating current flow induced in the compression spring is greater than in case of single compression springs, the change in magnetic field with a change in length of the double-body compression spring is greater than in case of a single compression spring, so that a change in the magnetic field thus can be ascertained more exactly with the use of a double-body compression spring than is possible with single compression springs.

The seat occupancy detection sensor element according to the invention basically can be used for individual seats, but also for double or triple seats. Also benches, e.g. a vehicle rear bench comprising several seats, can be equipped with seat occupancy detection sensor elements according to the invention.

The seat occupancy detection sensor element according to the invention can be arranged at or in the seat such that the force application side of the slidable member is arranged below the seat foam so that a weight force applied by a person sitting on the seat, via the seat foam, acts on the force application side of the slidable member. The force transfer thus is effected via the seat foam and the slidable member to the double-body compression spring.

It is just as well possible to arrange the seat occupancy detection sensor element at a different location of the seat, e.g. in the seat foam proper.

By way of such a qualified statement on the magnitude of the force acting on the force application side of the slidable member, it is possible with a seat occupancy detection sensor element to determine the weight of the person sitting on the seat, and this finding can be suitably utilized, e.g. for intelligent restraint systems with personal classification and matched actuation strategy for belt tensioners, belt force limiters and airbags.

In a first embodiment of the invention, the current generating, measuring and evaluating unit is designed such that, for determining the force acting on the force application side of the slidable member from the overall impedance measured, recourse is taken to stored reference values, in which various measuring values are associated with the overall impedance of the respective spring length of the double-body compression spring and/or of the respective causal force acting on the force application side of the slidable member.

These reference values can be suitably determined before and ordered accordingly, i. e. stored in the form of a table. This embodiment permits simple and reliable association of each overall impedance measured with the respective causal force.

In accordance with another embodiment of the invention, the measuring measuring coil is connected to a capacitor so that the inductively coupled coil assembly constitutes a resonant circuit which in particular can be operated in parallel resonance with respect to the frequency of the measuring current.

It is possible thereby to still further increase the overall inductance and the overall impedance, which permits an exact determination already of very small changes in length of the compression spring and of the forces effecting such changes in length. The resolution obtainable thus is enhanced further.

The double-body compression spring comprises outer compression spring windings of greater diameter and inner compression spring windings of smaller diameter, that are connected to each other by a transition portion.

In accordance with a further embodiment of the invention, the double-body compression spring has the lowermost winding of the outer compression spring windings and/or the lowermost winding of the inner compression spring windings abutting the floor of the substantially cylindrical recess of the base member, thus constituting a simple and at the same time compact design of the seat occupancy sensor element.

In accordance with a further embodiment of the invention, the double-body compression spring has its uppermost transition portion, interconnecting the outer compression spring windings of greater diameter and the inner compression spring windings of smaller diameter, fixed to the slidable member. Such fixing can take place in that the transition portion of the double-body compression spring abuts the slidable member; the transition portion of the double-body compression spring can be supported just as well in a corresponding hooking, clipping of holding portion of the slidable member, or the transition portion of the double-body compression spring may be surrounded by the material of the slidable member, which can be obtained e.g. by injecting-molding material around the same.

In accordance with another embodiment of the invention, the maximum displacement distance of the slidable member to the base member is determined by the distance between the bottom side of the slidable member and the upper edge of the base member surrounding the substantially cylindrical recess. This maximum displacement distance in practical application is dimensioned such that that it is greater than, or corresponds to, the change in spring length resulting when subjected to the maximum passenger weight to be expected. This embodiment avoids undesired excessive loading of the double-body compression spring.

In accordance with another embodiment of the invention, the coil body extends from the floor of the substantially cylindrical recess to a position at the height of the upper edge of the base member surrounding the substantially cylindrical recess, or to a position slightly below the same. This avoids the effect that the slidable member exerts excessive force on the coil body, while the coil body at the same time is of sufficient height for the windings of the current conductor so that these are capable of generating and measuring a magnetic field sufficient for the measurement.

In accordance with another embodiment of the invention, the coil body comprises a coil winding portion with coil winding portion end pieces that are broadened with respect to the coil winding portion and confine the coil winding portion upwardly and downwardly, as well as a coil anchoring portion by which the measuring coil is fixedly supported with respect to the base member. The coil winding portion has a current conductor, in particular a coil wire, wound around the same, with both ends thereof leading to the current generating, measuring and evaluating unit. This constitutes a particularly compact and robust design.

For guiding the current conductor in safe and protective manner, the coil body can be provided at least in its lower coil winding portion end piece and/or its coil anchoring portion with at least one current conductor guide groove extending substantially in axial or slightly inclined manner.

In accordance with a further embodiment, the slidable member has a guiding portion guiding the same with respect to the base member, in particular with respect to a wall of the base member, in case of displacement due to a force acting on the force application side.

In accordance with a further embodiment of the invention, the slidable member at least partly has the form of a cap. It is thus ensured that the the substantially cylindrical recess, the measuring coil arranged therein and the double-body compression spring arranged therein are not easily accessible from outside and are protected accordingly.

The guiding portion of the slidable member with respect to the base member preferably can be provided outside, e.g. on a outer wall of the base member.

The base member in a further embodiment of the invention may comprise mounting portions which in a seat occupancy detection sensor element are intended to be mounted on juxtaposed shaped springs or shaped spring portions of a spring mat of a seat. Such mounting portions may be in the form of hooking or clipping portions; in another variant such mounting portions may completely surround the shaped springs or shaped spring portions, e.g. by injection molding material around the same. A seat occupancy detection sensor element according to the invention thus can be connected to the spring mat of a seat in reliable, positionally safe and permanent manner.

The invention also relates to an assembly of at least two sensor elements of the type described hereinbefore, the base portions of which are connected to each other by a connecting bridge having a mounting portion which in a seat occupancy detection sensor element is intended to be mounted to one or more shaped springs or shaped spring portions of a spring mat of a seat.

With such an arrangement according to the invention, it is possible to combine two or more sensor elements of the type described hereinbefore into a sensor element module or a sensor element assembly, respectively, which by means of a common connecting bridge can be fixed in reliable, positionally safe and permanent manner and, in case of a seat occupancy detection sensor element, can be mounted to the spring mat of a seat in reliable, positionally safe and permanent manner. The connecting bridge can be provided in the form of a hooking or clipping portion, or it can surround the one or more shaped springs or shaped spring portions, e.g. by injection-molding material around the same. As regards the sensor element assembly according to the invention, the advantages and embodiments are the same as those indicated hereinbefore with respect to the sensor element, which will not be repeated.

With an assembly of at least two sensor elements, there may be provided a common current generating, measuring and evaluating unit for the sensor elements, which is adapted to individually apply alternating current to the sensor elements, to measure the voltage and to ascertain therefrom the overall impedance and the force acting thereon.

The invention also relates to a spring mat for a seat, in particular for a motor vehicle seat, comprising a plurality of shaped springs for attachment to a seat frame and at least one seat occupancy sensor element of the type described hereinbefore, the base member of which is mounted on at least one shaped spring, preferably hooked to the shaped spring or positively, i.e. in form-fitting manner, surrounds the shaped spring, with the slidable member being arranged such that its force application side is located on the side of the spring mat directed towards the seat foam, and/or at least an assembly of two sensor elements of the type described hereinbefore, the base members of which are mounted on at least one shaped spring, in particular by means of a connecting bridge hooked to at least one shaped spring or positively surrounding the shaped spring, with the slidable members being arranged such that their force application sides are located on the spring mat side directed towards the seat foam.

The advantages and embodiments indicated hereinbefore with respect to the seat occupancy sensor element arise for the spring mat according to the invention as well, so that these will not be repeated here. Such a spring mat can be manufactured easily and inexpensively and be provided with at least one seat occupancy sensor element and/or an assembly of at least two seat occupancy sensor elements. It is possible just as well to retro-fit existing spring mats with at least one seat occupancy sensor element according to the invention and/or at least one assembly of two seat occupancy sensor elements according to the invention.

The invention moreover relates to a substructure for a seat, in particular a motor vehicle seat comprising a spring mat of the type described hereinbefore and a seat frame surrounding this spring mat and having the spring mat mounted thereon.

The advantages and embodiments indicated hereinbefore with respect to the inventive seat occupancy sensor element, the inventive assembly of two seat occupancy sensor elements and the inventive spring mat for a seat also present themselves for such a substructure for a seat, and therefore will not be repeated. Moreover, such a substructure can be manufactured easily and inexpensively by mounting an inventive spring mat, provided with at least one seat occupancy sensor element and/or at least one inventive assembly of at least two seat occupancy sensor elements, on the seat frame, in particular by hooking the same to the seat frame.

The invention furthermore relates to a seat, in particular a motor vehicle seat, comprising a substructure of the type described hereinbefore. On the upper side of the substructure, there are arranged a seat foam and a seat cover such that, by application of force by a person sitting on the seat, the slidable member or members, respectively, of the at least one seat occupancy sensor element is/are displaced towards the base member and the double-body compression spring(s) is/are compressed from the initial state to a compressed state in which the double-body compression spring has a smaller spring length in accordance with the magnitude of the force applied. The current generating, measuring and evaluating unit is designed such that it determines the weight of the person sitting on the seat from the overall impedance.

The current generating, measuring and evaluating unit can be designed such that it measures the voltage and determines the impedance from the same, and has an electronics unit of its own for each seat occupancy sensor element. A common connection via multiplexers is optionally possible as well. The current generating, measuring and evaluating unit then can make available its output signals via a suitable interface, e.g. an USB interface or a LIN-Bus interface, to the control units concerned, e.g. the motor controller, the airbag controller and the like. The current generating, measuring and evaluating unit can be built so small that it can be mounted without any problem underneath the seat, e.g. on the bottom side of the seat substructure, with miniaturization to the size of a matchbox being possible as well.

In accordance with an embodiment of the invention, the current generating, measuring and evaluating unit may be mounted directly underneath the seat or on the bottom side of the substructure. The current generating, measuring and evaluating unit thus can be arranged safely, permanently and hidden from view.

In accordance with a further embodiment of the invention, the current generating, measuring and evaluating unit is designed to determine from the changed magnetic field the weight of the person sitting on the seat, and to issue a corresponding output signal.

With a spring mat for a seat, a substructure for a seat and a seat according to the present invention, it is possible to provide for the seat occupancy sensor elements a common current generating, measuring and evaluating unit that is adapted to apply alternating current to all sensor elements individually and to measure the voltage for each sensor element and determine therefrom the overall impedance and the force applied. To this end, the common current generating, measuring and evaluating unit may have a separate switching electronic unit for each sensor element, and these electronics units possibly can be connected together via multiplexers.

BRIEF DESCRIPTION OF THE DRAWINGS

The invention will be elucidated in the following by way of embodiments illustrated in the drawings in which.

DESCRIPTION OF THE EMBODIMENTS

In the following embodiments, there will be described seat occupancy sensor elements and assemblies of seat occupancy sensor elements, respectively. It is easily apparent to the person skilled in the art that the sensor elements according to the invention are suitable for any other purposes in which a force applied is to be determined precisely and easily.

Figure 1:
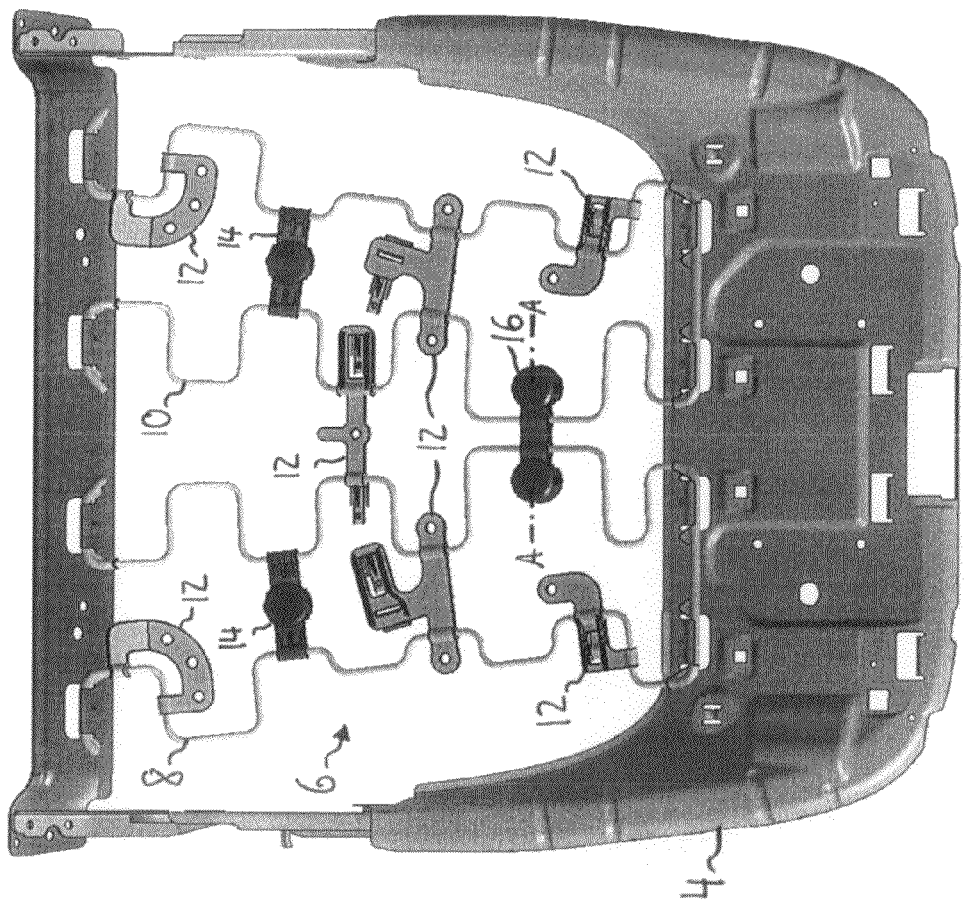
FIG. 1 is a plan view of a vehicle seat substructure according to an embodiment of the invention, comprising a seat frame and a spring mat having mounting elements, two seat occupancy sensor elements and an assembly of two seat occupancy sensor elements mounted thereon.

FIG. 1 shows a plan view of a vehicle seat substructure 2 comprising a seat frame 4 and a spring mat 6, on which mounting members 12, two seat occupancy sensor elements 14 and an assembly 16 of two seat occupancy sensor elements are mounted.

The vehicle seat substructure 2 in FIG. 1 is an exemplary vehicle seat substructure, as it is used for a driver seat or a front passenger seat of a motor vehicle. The vehicle seat substructure has seat foam and a seat cover provided thereon, which constitutes the seating area for the driver/passenger.

The vehicle seat substructure 2 comprises a seat frame 4 having a rear transverse strut and a forward supporting portion which in plan view is roughly U-shaped and the shape of which matches the bottom side of the seat foam and which is connected to the rear transverse strut by means of lateral longitudinal connecting members. The forward supporting portion and the rear transverse strut are provided with a plurality of recesses, and moreover the rear strut has four approx. equidistant hooking portions and the forward supporting portion, in its rearwardly directed central portion, also has four equidistant hooking portions. A first shaped spring 8 is hooked into the two left hooking portions of the forward supporting portions and the rear transverse strut, respectively, and a second shaped spring 10 is hooked into the two right hooking portions of the forward supporting portion and the rear transverse strut, respectively.

The two shaped springs 8 and 10 each are of identical shape, with the second shaped spring 10 being arranged in mirror-symmetrical manner about the longitudinal axis of the vehicle seat substructure 2. The shaped springs 8 and 10 each have a left, rear hooking end, a forward central hooking portion and a right rear hooking end as well as a spring half extending between the left lower hooking portion and the forward hooking central portion and a spring half extending between the right rear hooking portion and the forward central hooking portion. The two spring halves each constitute a bent wave-like pattern between left rear hooking end and forward central portion. In the left spring half of the first shaped spring 8, the spring wire from the rear to the front makes two successive bends each by 90 degrees to the right, then two successive bends each by 90 degrees to the left, again two successive bends each by 90 degrees to the right and then again two successive bends each by 90 degrees to the left, and so on. In the right spring half of the second shaped spring 8, the spring wire—from the rear to the front—makes two successive bends to the left, followed by two successive bends to the right, followed again by two successive bends to the left, followed by two successive bends to the right, and so on. The first shaped spring 8, from its rear left hooking portion to its forward central hooking portion thus has four curves to the right and four curves to the left; from the right rear hooking portion to the forward central hooking portion, the first shaped spring 8 also has four curves to the left and four curves to the right. The course of the left and right curves is irregular. The left and right spring halves of the first shaped spring 8, except for the rear hooking ends and the forward central portion, follow a different, non-mirror symmetrical course.

The course and arrangement of the second shaped spring 10 is mirror-symmetrical to the course and arrangement of the first shaped spring 8 about the longitudinal axis of the vehicle seat substructure 2.

At the rear right curve of the left spring half of the first shaped spring 8 and on the rear left curve of the right spring half of the second shaped spring 10, there is mounted one mounting member 12 each. Additional mounting members 12 are mounted between the third right curve of the left spring half and the third right curve of the right spring half of the first shaped spring 8 and between the third left curve of the right spring half and the third left curve of the left spring half of the second shaped spring 10. Further mounting members 12 are mounted on the forward-most right curve of the left spring half of the first shaped spring 8 and on the forward-most left curve of the right spring halve of the second shaped spring 10. It is possible by means of these mounting members 12 to mount a seat foam (not shown) on the vehicle seat substructure 2.

A first seat occupancy sensor element 14 is mounted between the second right curve of the left spring half and the second left curve of the right spring half of the first shaped spring 8, and another first seat occupancy sensor element 14 of like structure is mounted between the second left curve of the right spring half and the second right curve of the left spring half of the second shaped spring 10. The sensor element proper is formed in the circular portion between the spring halves, and this sensor element, by means of mounting portions extending from this sensor element to the left and to the right, is attached to the spring portions, and preferably is hooked into the same or is injection-molded around these spring portions.

Furthermore, an assembly 16 of two seat occupancy sensor elements is mounted on the third right curve of the right spring half of the first shaped spring 8 and to the third left curve of the left spring half of the second shaped spring 10. In this regard, the left seat occupancy sensor element of assembly 16 constitutes the left end of this assembly 16 and is arranged to the left of the third right curve of the ring spring half of the first shaped spring 8; in like manner, the right seat occupancy sensor element 16 constitutes the right end of assembly 16 and is arranged to the right of the third left curve of the left spring half of the second shaped spring 10. Between these sensor elements of assembly 16, there is provided a connecting bridge connecting the assembly 16 to the spring portions, in particular hooking the assembly 16 into the same or being injecting-molded around the same.

A sectional line A-A extends in transverse direction of the vehicle seat substructure 2 through said assembly 16 of two seat occupancy sensor elements.

Figure 2:
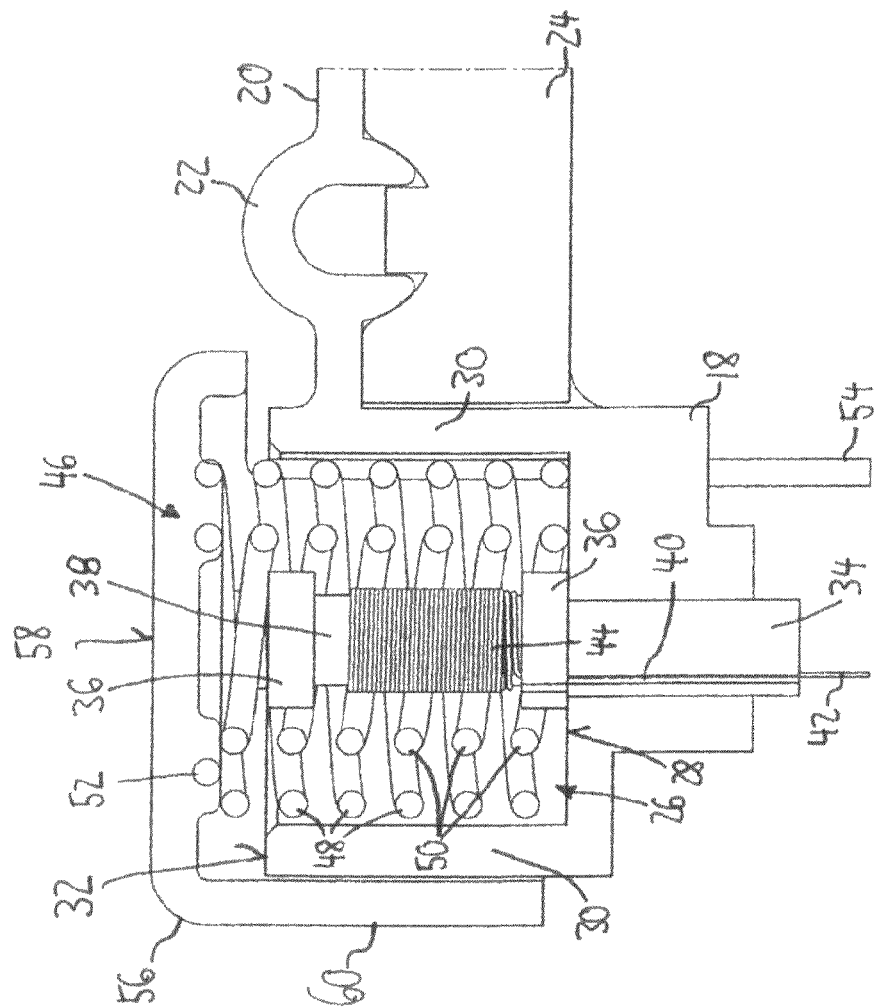
FIG. 2 is a perspective view of the left half of the assembly of two seat occupancy sensor elements of FIG. 1 according to an embodiment of the invention, illustrating the base member, the double-body compression spring and the movable member in a sectional view, but the measuring coil in a non-sectional view.

FIG. 2 shows a perspective view of the left half of the assembly 16 of two seat occupancy sensor elements, illustrating base member 18, double-body compression spring 46 and movable member 56 in a sectional view, but illustrating measuring coil 44 in a non-sectional view.

Figure 3:
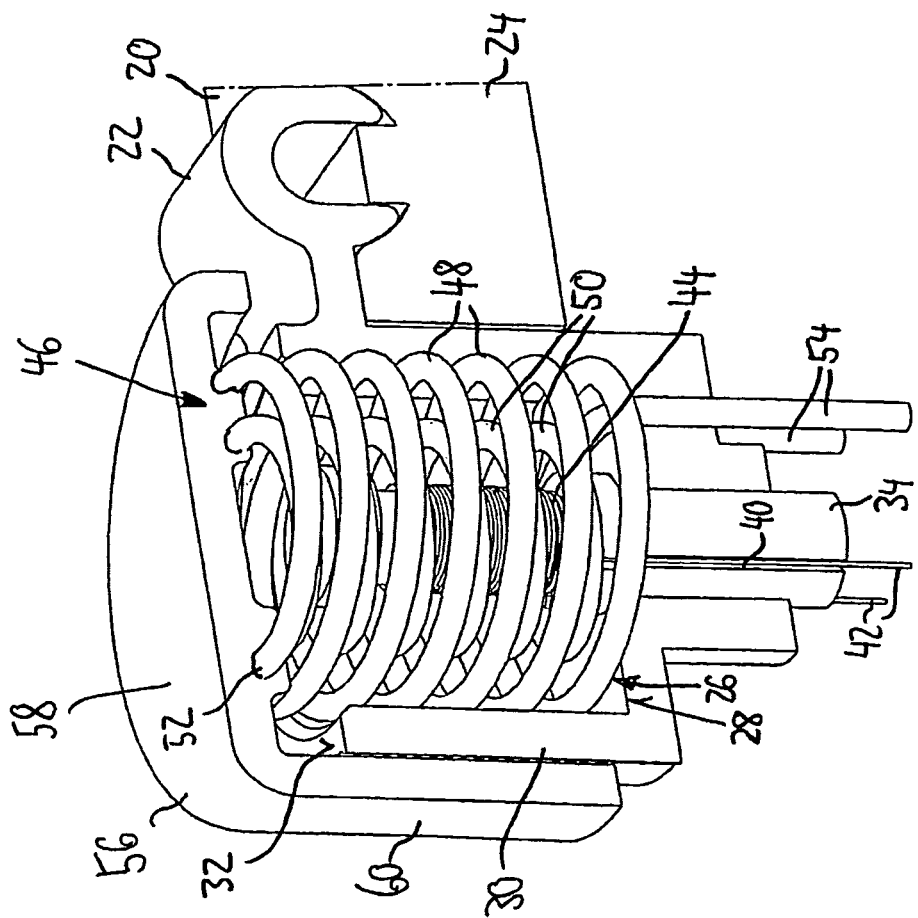
FIG. 3 shows a perspective view of the left half of the assembly of two seat occupancy sensor elements of FIG. 2, illustrating the base member and the movable member in a sectional view, but the measuring coil in a non-sectional view.
Figure 4:
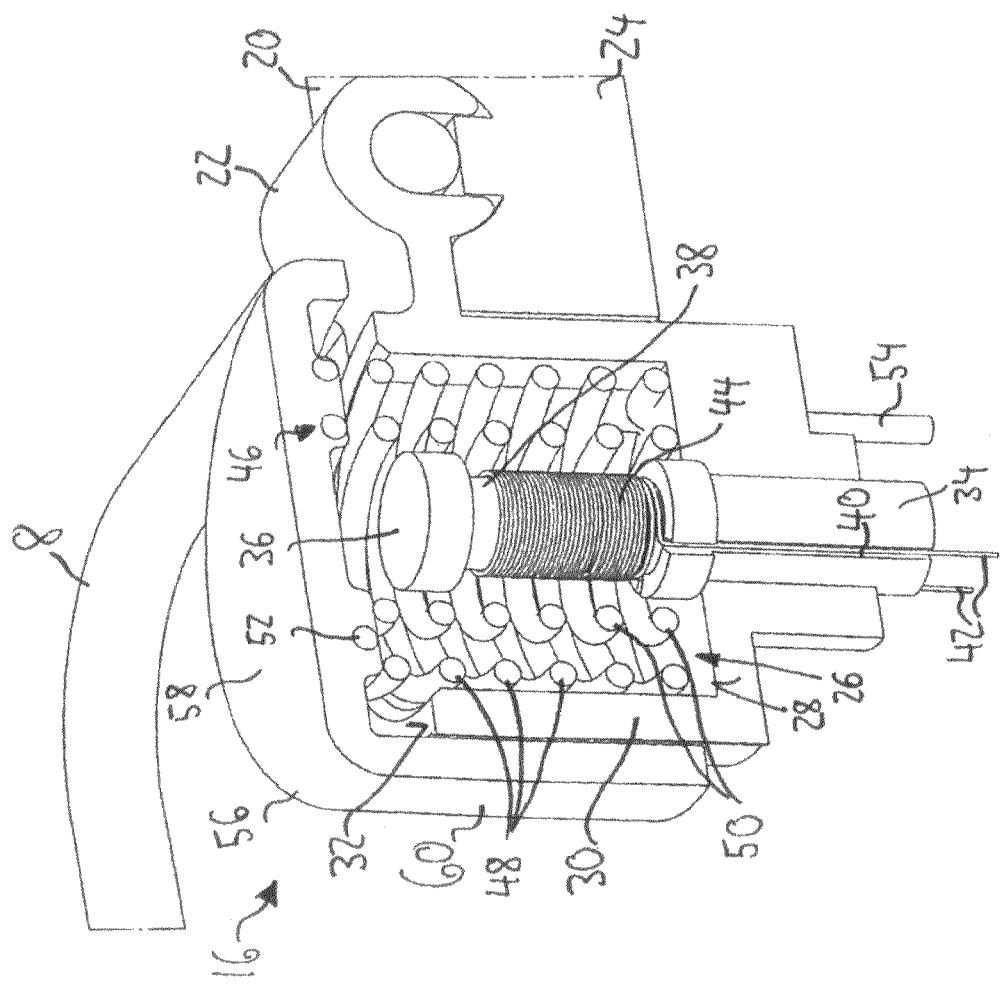
FIG. 4 shows a perspective view of the left half of the assembly of two seat occupancy sensor elements of FIGS. 2 and 3, illustrating the base member, the double-body compression spring and the movable member in a sectional view, but the measuring coil in a non-sectional view.

The views of FIGS. 2, 3 and 4 are sectional views along sectional line A-A of FIG. 1. The hatching of the areas in section has been omitted for enhanced illustration. The sectional views of FIGS. 2, 3 and 4, for simplification, illustrate only the left half of the assembly 16 of FIG. 1, including the left seat occupancy sensor element, with the right half, which is mirror-symmetrical to the left half, having been omitted for providing a clearer illustration.

The left seat occupancy sensor element of the assembly 16 of two seat occupancy sensor elements in the following shall be referred to just as sensor element for the sake of simplicity.

The sensor element comprises a base member 18, which is connected by a connecting bridge 20 having two hooking portions 22—of which only the left hooking portion 22 is shown in each of FIGS. 2 to 4—to the right sensor element that is not illustrated in FIGS. 2 to 4. By means of a counterpart 24 that is slid on from below between the sensor elements and into the hooking portions 22 and is suitably fixed to the connecting bridge 20, the hooking portions 22 or the insides of the sensor elements, there is ensured a reliable and durable connection of the assembly 16 to shaped springs 8 and 10.

The base member 18 of the sensor element is provided with a cylindrical receiving space 26 having a horizontal floor area 28 and being surrounded by a cylinder wall 30 the inside of which constitutes the wall area of the cylindrical receiving space. The cylinder wall 30, on its upper side, forms an annular end wall 32 which may be rounded or chamfered on its inside to avoid sharp edges. Centrally in the cylindrical receiving space 26 and extending through the floor of base member 18, there is disposed a measuring coil 44 having a coil fixing member 34 which is disposed in a corresponding recess in the floor of base member 18, a cylindrical lower coil winding portion end piece 36 that is broadened with respect to said fixing member and has its outer lower ring portion seated on floor area 28, a cylindrical coil winding portion 38 which is slightly narrower than said end piece and around which the coil wire 42 is wound in numerous turns, and a broadened cylindrical upper coil winding portion end piece 36 the diameter of which corresponds to that the of lower coil winding portion end piece 36 and the top side of which is located flush with the annular end face 32. The ends of the coil wire 42 are passed via current conductor guiding grooves 40 in the lower coil winding portion end piece 36 and the coil fixing member to a current generating, measuring and evaluating unit that is not illustrated in the drawings. Of the two ends of the coil wire 42 and the two current conductor guiding grooves 40, FIG. 2 shows only one coil wire 42 and one coil wire guiding groove 40 each.

The portion of the measuring coil 44 that is constituted by the coil winding portion end pieces 36 and the coil winding portion 38 with coil wire windings, is surrounded by a double-body compression spring 46 comprising outer compression spring windings 48 of greater diameter, inner compression spring windings 50 of smaller diameter and a topmost transition portion 52 between outer and inner compression spring windings. The outer compression spring windings 48 have constant inner and outer diameters, with a slight distance being present between the outer diameter of the outer compression spring windings 48 and the inner surface of cylinder wall 30, which has the effect that, also in case of slight bending or kinking of the compression spring 46, the outer windings 48 do not establish contact with the inner surface of cylinder wall 30. The inner compression spring windings 50 also are of constant outer diameter and constant inner diameter and are arranged in the intermediate space between measuring coil 44 and outer compression spring windings 48. The respective lowermost windings of the outer compression spring windings 48 and the inner compression spring windings 50 abut the floor area 28. Both the outer compression spring windings 48 and the inner compression spring windings 50, in the exemplary non-restricting embodiment, each comprise six windings, with the outer compression spring windings 48 being wound rightwards and the inner compression spring windings 50 being wound leftwards. The compression spring 46 extends upwardly somewhat beyond the annular end face 32 and in its transition portion 52 is connected to slidable member 56; in the present embodiment, the transition portion 52 is partially surrounded by the material of movable member 56 and thus is fixedly connected thereto. This connection may be established by injecting-molding the movable member 56 around the transition portion 52.

The ends of the spring wire of the double-body compression spring 46 in the present embodiment are passed through the floor of base member 18 and are electrically connected to each other there.

The measuring coil 44 is connected to a capacitor, which is not shown here, and is inductively coupled to the double-body compression spring 46, constituting a spring coil/inductance, so as to form a coil assembly 44, 46. This coil assembly 44, 46 constitutes a resonant circuit which can be operated in parallel resonance with respect to the frequency of the measuring current.

The slidable member 56 comprises an upper, substantially horizontal force application side 58 which, assuming that a seat foam with seat cover is arranged on the vehicle seat substructure 2 and a person takes a seat thereon, has a force applied thereto via said seat cover and said seat foam, which urges the movable member 56 downwardly and compresses the double-body compression spring 46. The movable member 56 has at least in part the shape of a cap, with the outer, axially directed guide wall portion 60 extending further downwardly than the inner wall portion. Due to the cap-like design of the movable member 56, the cylindrical receiving space 26 along with the double-body compression spring 46 and the measuring coil 44 is protected against effects from outside. The maximum movement distance of the movable member 56 in axial direction is defined by the distance between the annular end face 32 of base member 18 and the bottom side of the opposite annular inner portion of the slidable member 56.

FIG. 3 shows a perspective view of the left half of the assembly 16 of two seat occupancy sensor elements, in which the base member 18 and the movable member 56 are illustrated in a sectional view, while measuring coil 44 is illustrated in a non-sectional view.

The illustration according to FIG. 3 shows in addition both spring wire ends 54, which are electrically connected to each other.

Moreover, FIG. 3 shows both coil wire ends 42 extending to the current generating, measuring and evaluating unit that is not shown in the figures. Furthermore, the outer compression spring windings 48 and the inner compression spring windings 50 can be seen in their entire course, and the uppermost transition portion 52 can be seen particularly well, in which the uppermost winding of the outer compression spring windings 48, by a reduction in diameter, is connected to the uppermost winding of the inner compression spring windings 50.

FIG. 4 illustrates a perspective view of the left half of the assembly 16 of two seat occupancy sensor elements, illustrating the base member 18, the double-body compression spring 46 and the movable member 56 in a sectional view, while measuring coil 44 is not shown in section.

The cap-like design of the slidable member 56 can be seen particularly well in FIGS. 3 and 4.

FIGS. 2 and 4 also reveal the manner in which the spring wire, subsequent to the lowermost one of the outer compression spring windings 48 is bent downwardly in the right end portion of the floor area 28, and it is easy to imagine how this spring wire extends through the bottom of base member 18 before it exits from the bottom thereof, as can be seen as well.

Furthermore, FIG. 4 shows the portion of the third right curve of the right half of the first shaped spring 8 that is located behind the assembly 16, and it can be seen clearly that the hooking portion 22 is hooked from above onto the first shaped spring 8 and is closed by way of counterpart 24 from below, so that the assembly 16 of two seat occupancy sensor elements is safely mounted on spring mat 6.

Figure 5:
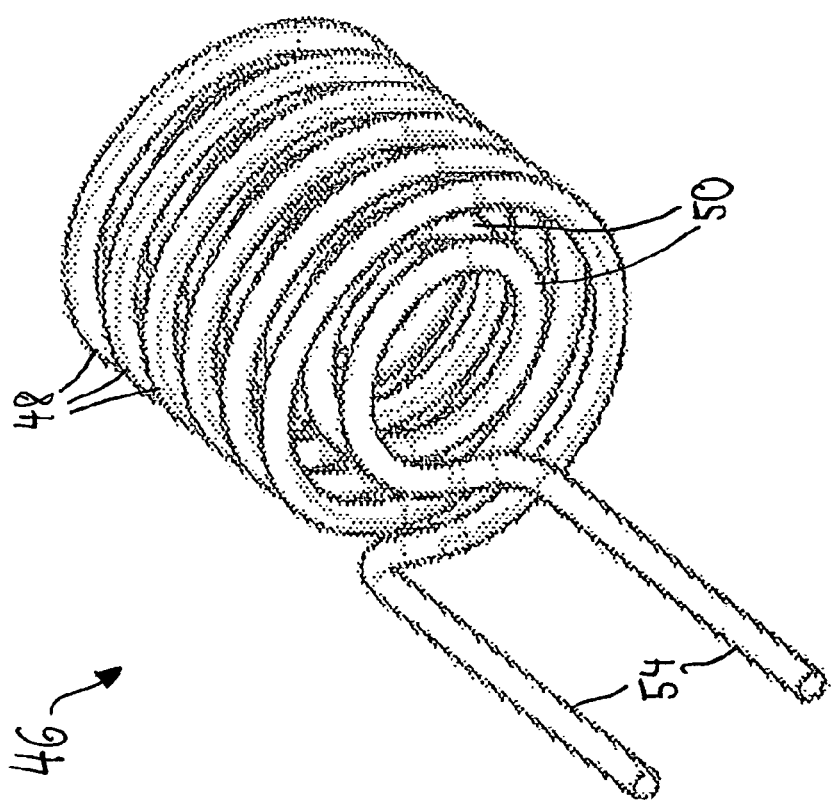
FIG. 5 shows a perspective view of the double-body compression spring of the seat occupancy sensor elements of FIGS. 1 to 4.
Figure 1:
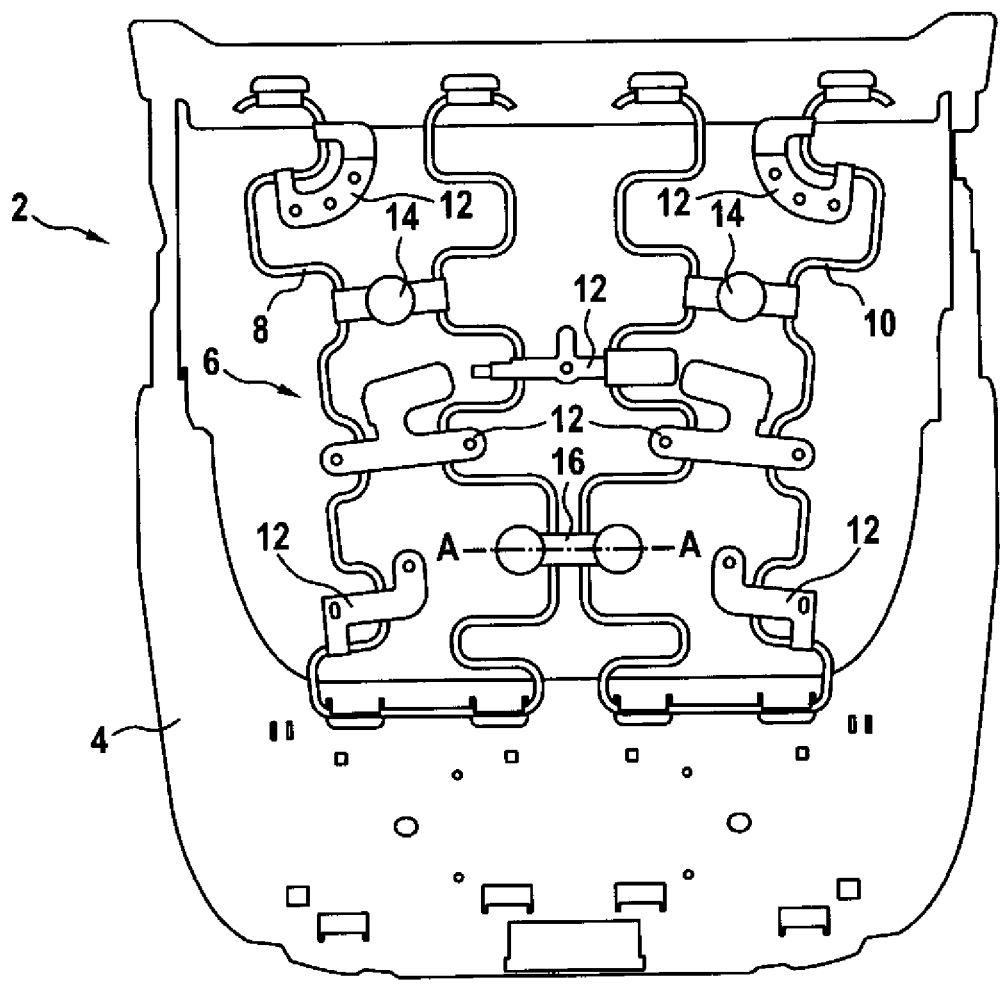
Figure 2:
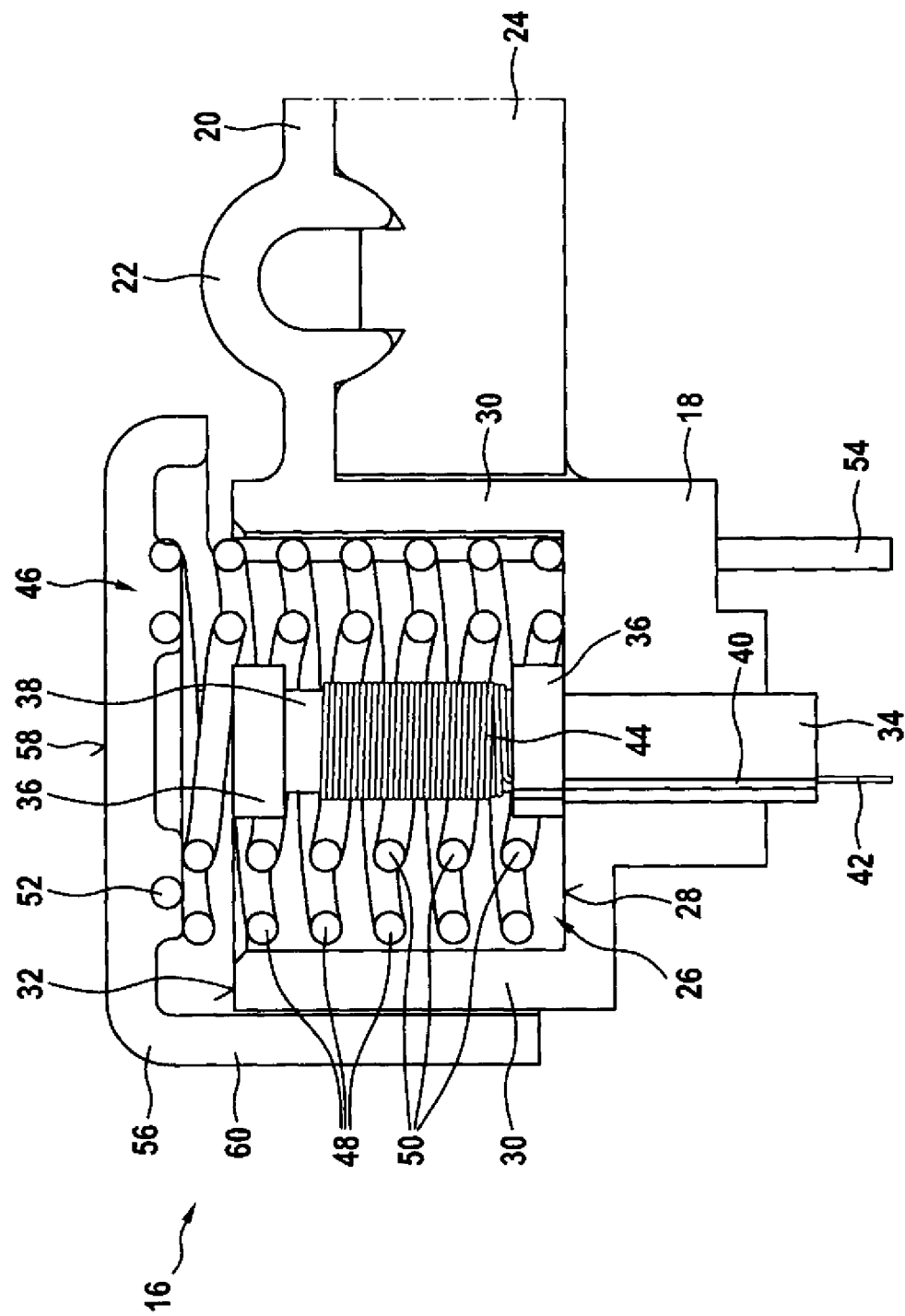
Figure 3:
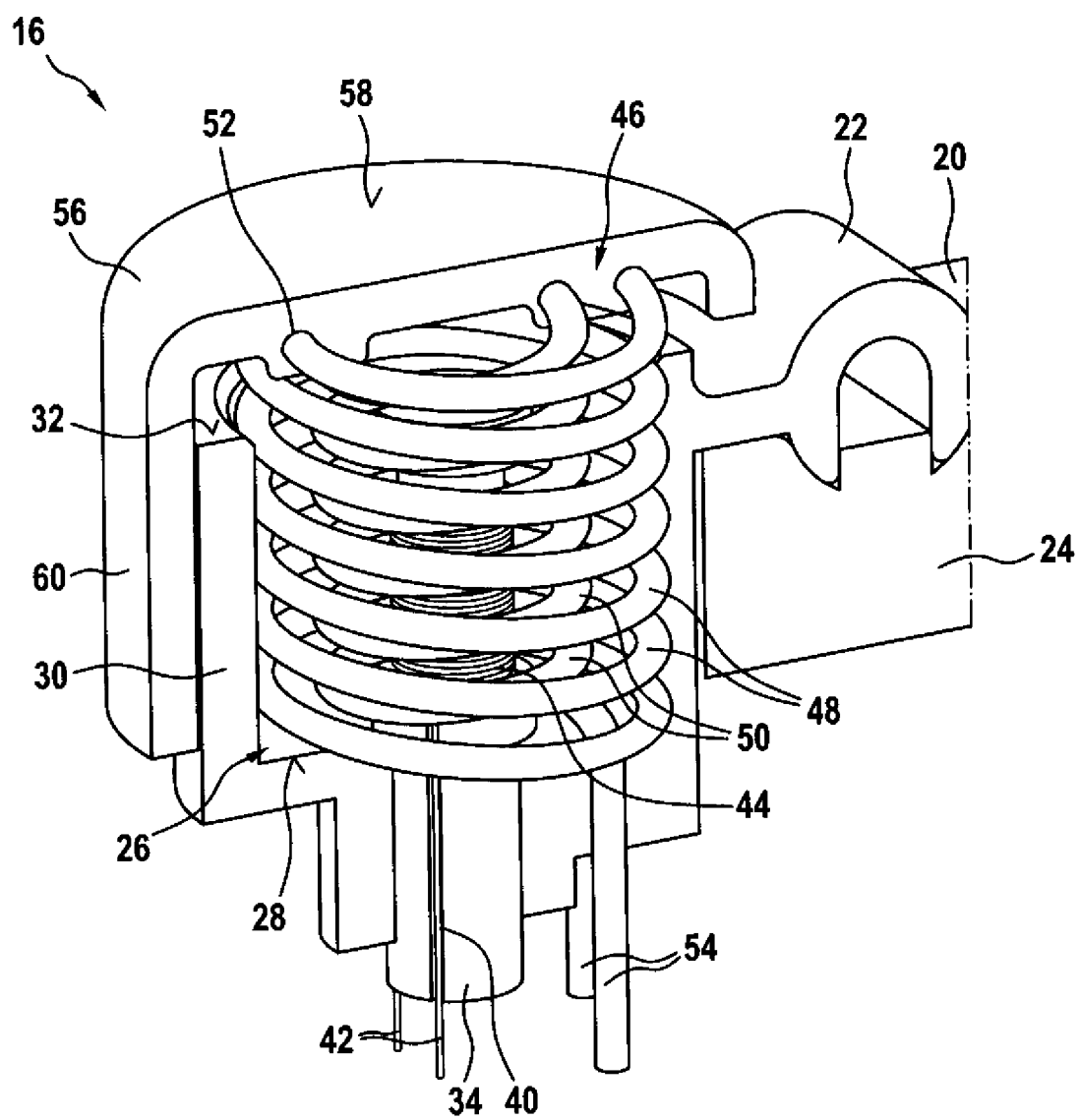
Figure 5:
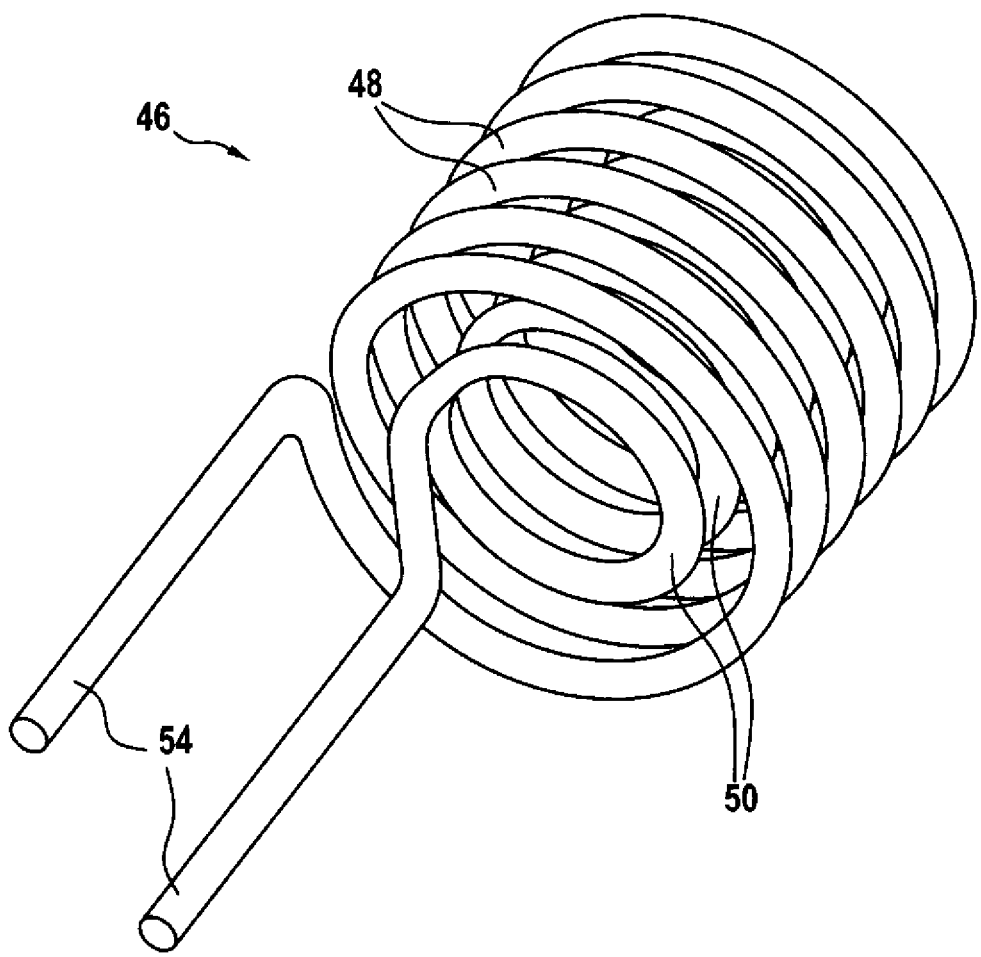

FIG. 5 illustrates a perspective view of the double-body compression spring 46 of the seat occupancy sensor elements of FIGS. 1 to 4.

FIG. 5 shows the double-body compression spring 46 in the state in which it is not yet installed in the seat occupancy sensor element. The view shows in particular the course of the spring wire underneath the lowermost inner compression spring windings 50 and underneath the lowermost outer compression spring windings 48. In particular, the spring wire, subsequent to the lowermost one of the outer compression spring windings 48, is bent such that it extends in axial direction thereafter, and the spring wire, subsequent to the lowermost one of the inner compression spring windings 50, also is bent such that it extends substantially in axial direction thereafter. Both axially extending ends of the compression spring wire 54 are arranged in parallel and in a distance corresponding to about one fifth of the circumference of the outer compression spring windings 48.

The ends of the compression spring wire 54 are electrically connected to each other, which is not shown in FIG. 5, so that the double-body compression spring 46 constitutes a spring coil.

The seat occupancy detection operation shall be described in more detail in the following by way of the sensor element of the assembly 16 of two sensor elements, shown in FIGS. 1 to 4.

When a person, i.e. a driver or front passenger, takes a seat on the seat cover and the seat foam, the weight force of the same acts via said seat foam onto the force application side 58 of the slidable member 56 and urges this slidable member 58 downwardly and compresses the double-body compression spring 46 by the movement distance that can be calculated from the spring rate and the acting weight force.

A defined alternating current is continuously supplied to the measuring coil 44 by the current generating, measuring and evaluating unit. Thus, there is generated a magnetic field around the measuring coil 44, and in particular around the coil wire windings of the coil winding portion 38, and this magnetic field induces an alternating current in the double-body compression spring 46 acting as a coil, with the compression spring as such generating a magnetic field as well. Thus, there are an overall magnetic field and an overall impedance resulting therefrom, which are due to the alternating current flow in the measuring coil 44 and the alternating current flow induced in the compression spring 46.

After the seat has been taken, the spring length of the double-body compression spring 46 is reduced, and there is a change effected in the alternating current induced in the double-body compression spring 46 and the resulting magnetic field as well as the resulting overall impedance.

The current generating, measuring and evaluating unit measures the voltage of the measuring coil 44 and, with current and voltage being known, can now ascertain the overall impedance.

The current generating, measuring and evaluating unit is adapted to ascertain, from the respective overall impedance ascertained, the causal force acting on the force application side of the slidable member, by taking recourse to known reference values in which various measuring values of the overall impedance are associated with a particular spring length of the double-body compression spring and/or the respective causal force acting on the force application side of the slidable member. These reference values can be stored e.g. in a table.

Accordingly, the seat occupancy detection sensor element is capable of precisely and reliably determining the force acting or applied.

When, as in case of the vehicle seat substructure 2, there are provided several sensor elements, in the embodiment of FIG. 1 a total of four sensor elements, the results can be improved still further and it is possible to determine a force distribution to various portions of the seat.

Advantageous characteristic values of the double-body compression spring 46 may be as follows: diameter 15.7 mm, length 14.5 mm, movement stroke 3 mm, 8 windings. With an alternating current flowing through the measuring coil, an overall impedance of 141.4 ohm results with a double-body compression spring in the uncompressed state/in the state compressed by a predetermined amount, and with the application of a force effecting a movement stroke of 3 mm of the double-body compression spring 46, an overall impedance of 131.1 ohm results.

LIST OF REFERENCE NUMERALS 2 vehicle seat substructure
4 seat frame
6 spring mat
8 first shaped spring
10 second shaped spring
12 mounting members
14 seat occupancy sensor element
16 assembly of two seat occupancy sensor elements
18 base member
20 mounting bridge
22 hooking portion
24 counterpart
26 cylindrical receiving space
28 floor area
30 cylinder wall
32 annular end face
34 coil fixing member
36 coil winding portion end pieces
38 coil winding portion
40 coil wire guiding groove
42 coil wire
44 measuring coil
46 double-body compression spring
48 outer compression spring windings
50 inner compression spring windings
52 transition portion between outer and inner compression spring windings
54 short-circuited portion of compression spring wire
56 slidable member
58 upper force application side
60 guiding portion

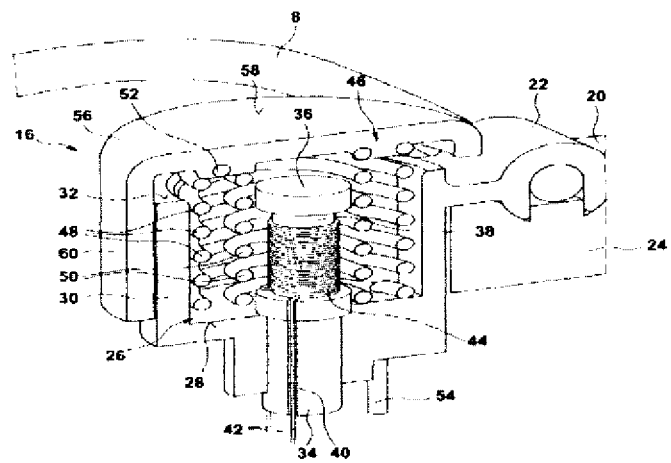

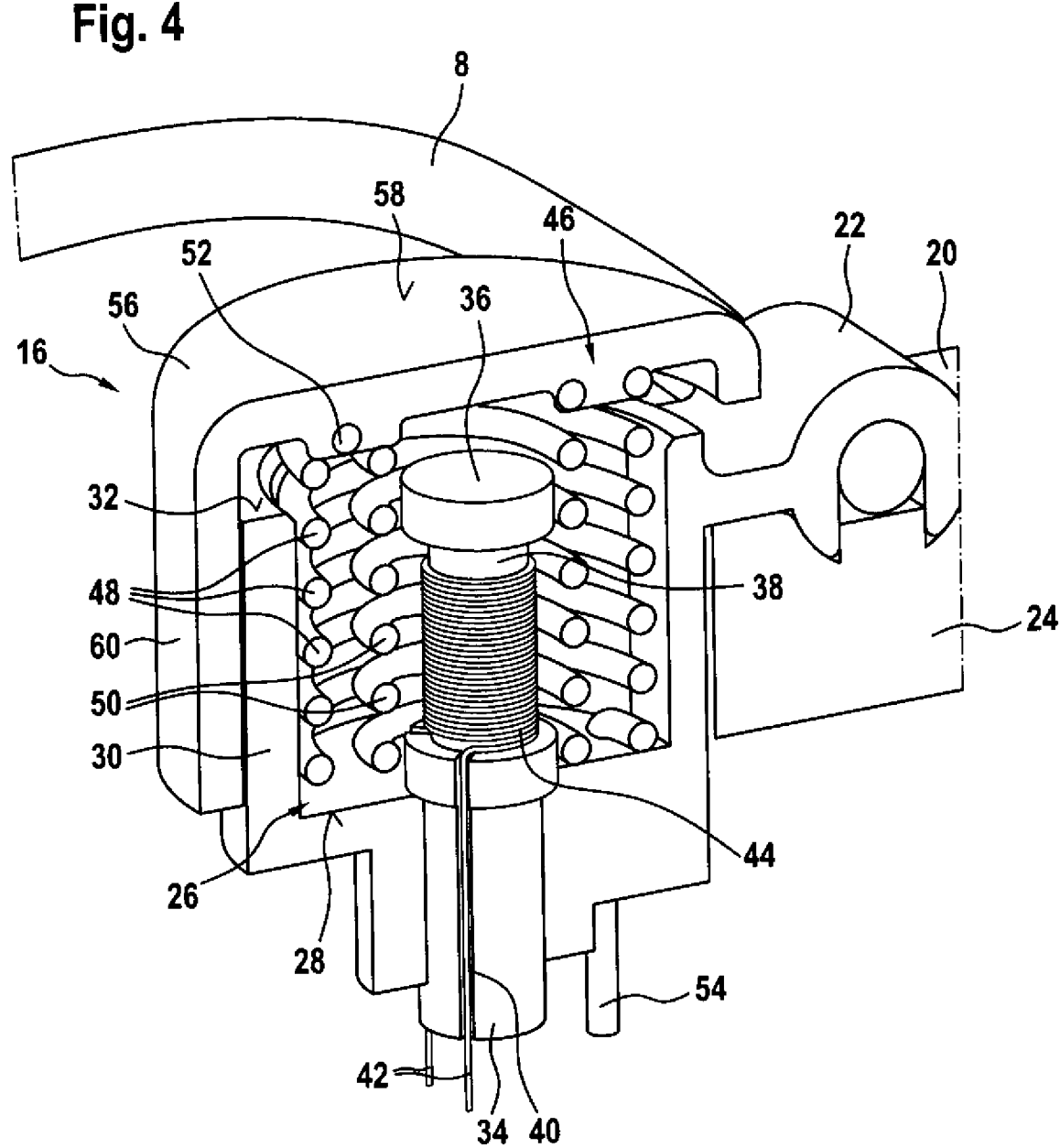

The invention claimed is:

1. A sensor element, in particular a seat occupancy detection sensor element (14), comprising:
  a double-body compression spring (46);
  a base member (18) having a substantially cylindrical recess (26) for receiving the double-body compression spring (46); and
  a slidable member (56) having a force application side (58) and an inside facing the base member (18);
  a measuring coil (44) arranged in the substantially cylindrical recess (26) and surrounded by the double-body compression spring (46) and having a wound coil wire (42); and
  a current generating, measuring and evaluating unit connected to the wound coil wire (42) of the measuring coil (44);
  wherein the double-body compression spring (46) abuts the base member (18) with its first end on the side of the base member and is fixed to the slidable member (56) with its second end on the side of the slidable member and is adapted to be compressed by a force acting on the force application side (58) of the slidable member (56), from an initial state in which the double-body compression spring (46) has an uncompressed initial spring length or an initial spring length compressed by a predetermined extent, into a compressed state of shorter spring length;
  wherein the spring wire ends (54) of the double-body compression spring (46) are connected to each other in electrically conducting manner so as to form a spring coil (46);
  wherein the measuring coil (44) and the spring coil (46) constitute an inductively coupled coil assembly (44, 46); and wherein the current generating, measuring and evaluating unit is designed such that it applies a defined alternating current to the measuring coil (44) so that an alternating current is induced in the double-body compression spring (46), that it measures the voltage on the measuring coil (44) that is proportional to the overall impedance of the inductively coupled coil assembly, and ascertains from said overall impedance the force acting on the force application side (58) of the slidable member (56).

2. A sensor element (14) according to claim 1, wherein the current generating, measuring and evaluating unit is designed, for determining the force acting on the force application side (58) of the slidable member (56) from the overall impedance measured, to take recourse to stored reference values in which various measuring values of the overall impedance are associated with the respective spring length of the double-body compression spring (46) and/or the respective causal force acting on the force application side (58) of the slidable member (56).

3. A sensor element (14) according to claim 2, wherein the measuring coil (44) is connected to a capacitor such that the inductively coupled coil assembly (44, 46) constitutes a resonant circuit which can be operated in particular in parallel resonance with respect to frequency of the measuring current.

4. A sensor element (14) according to claim 3, wherein the double-body compression spring (46) abuts the floor (28) of the substantially cylindrical recess (26) of the base member (18) with the lowermost winding of the outer compression spring windings (48) and/or with the lowermost winding of the inner compression spring windings (50), and/or wherein the double-body compression spring (46) is fixed to the slidable member (56) with its uppermost transition portion (52) connecting the outer compression spring windings (48) and the inner compression spring windings (50) to each other.

5. A sensor element (14) according to claim 4, wherein the maximum movement stroke of the slidable member (56) with respect to the base member (18) and/or the maximum movement stroke of the double-body compression spring (46) is/are defined by the distance between the bottom side of the slidable member (56) and the upper edge (32) of the base member (18) surrounding the substantially cylindrical recess (26).

6. A sensor element (14) according to claim 5, wherein the measuring coil (44) has a coil body (34) extending from the floor (28) of the substantially cylindrical recess (26) to a position at the height of the upper edge (32) of the base member (18) surrounding the substantially cylindrical recess (26), or to a position slightly below the same.

7. A sensor element (14) according to claim 6, wherein the coil body (34) has a coil winding portion (38) with coil winding portion end pieces (36) which in particular are broadened with respect to the coil winding portion, and a coil anchoring portion by which the measuring coil is fixedly supported with respect to the base member (18), the coil winding portion (38) having the coil wire (42) wound around the same, with both ends thereof leading to the current generating, measuring and evaluating unit.

8. A sensor element (14) according to claim 7, wherein the base member (18) has mounting portions in particular for mounting to juxtaposed shaped springs or shaped spring portions of a spring mat (6) of a seat.

9. An assembly (16) of at least two sensor elements according to claim 8, the base portions of which are connected to each other by a connecting bridge (20), the connecting bridge (20) having a mounting portion in particular for mounting to one or more shaped springs or shaped spring portions of a spring mat (6) of a seat.

10. A spring mat (6) for a seat, in particular a motor vehicle seat, comprising:
a plurality of shaped springs (8, 10) for mounting to a seat frame (4), and
at least one seat occupancy sensor element (14) according to claim 8, the base member of which is mounted to at least one shaped spring (8, 10), in particular is hooked to the shaped spring (8, 10) or positively surrounds the shaped spring (8, 10), with the slidable member (56) being arranged such that its force application side (58) is arranged on the seat of the spring mat (6) directed towards the seat foam; and/or
at least one assembly (14) of at least two seat occupancy sensor elements according to claim 9, the base members of which are mounted to at least one shaped spring (8, 10), in particular by means of a connecting bridge (20) that is hooked to at least one shaped spring (8, 10) or positively surrounds the shaped spring (8, 10), with the slidable members (56) being arranged such that the force application sides (58) of the same are arranged on the side of the spring mat (6) directed towards the seat foam.

11. A substructure (2) for a seat, in particular a motor vehicle seat, comprising a spring mat (6) according to claim 10 and a seat frame (4) surrounding the spring mat (6) and having the spring mat (6) mounted thereon.

12. A seat, in particular a motor vehicle seat, comprising a substructure (2) according to claim 11,
the seat having on its upper side, a seat foam and a seat cover arranged above the spring mat (6) such that, by application of force by a person sitting on the seat, the slidable member (56) or members (56), respectively, of the at least one seat occupancy sensor elements (14) is/are displaced in the direction of the base member (18) and the double-body compression spring(s) (46) are compressed from the initial state to a compressed state in which the double-body compression spring (46) has a smaller spring length due to the magnitude of the force applied; and
wherein the current generating, measuring and evaluating unit is designed to determine the weight of the person sitting on the seat from the overall impedance measured.

13. A seat according to claim 12, wherein the current generating, measuring and evaluating unit is arranged underneath the motor vehicle seat.

14. A sensor element (14) according to claim 1, wherein the measuring coil (44) is connected to a capacitor such that the inductively coupled coil assembly (44, 46) constitutes a resonant circuit which can be operated in particular in parallel resonance with respect to frequency of the measuring current.

15. A sensor element (14) according to claim 1, wherein the maximum movement stroke of the slidable member (56) with respect to the base member (18) and/or the maximum movement stroke of the double-body compression spring (46) is/are defined by the distance between the bottom side of the slidable member (56) and the upper edge (32) of the base member (18) surrounding the substantially cylindrical recess (26).

16. A sensor element (14) according to claim 1, wherein the measuring coil (44) has a coil body (34) extending from the floor (28) of the substantially cylindrical recess (26) to a position at the height of the upper edge (32) of the base member (18) surrounding the substantially cylindrical recess (26), or to a position slightly below the same.

17. A sensor element (14) according to claim 1, wherein the base member (18) has mounting portions in particular for mounting to juxtaposed shaped springs or shaped spring portions of a spring mat (6) of a seat.

18. An assembly (16) of at least two sensor elements according to claim 1, the base portions of which are connected to each other by a connecting bridge (20), the connecting bridge (20) having a mounting portion in particular for mounting to one or more shaped springs or shaped spring portions of a spring mat (6) of a seat.

19. A spring mat (6) for a seat, in particular a motor vehicle seat, comprising:
- a plurality of shaped springs (8, 10) for mounting to a seat frame (4), and
- at least one seat occupancy sensor element (14) according to claim 1, the base member of which is mounted to at least one shaped spring (8, 10), in particular is hooked to the shaped spring (8, 10) or positively surrounds the shaped spring (8, 10), with the slidable member (56) being arranged such that its force application side (58) is arranged on the seat of the spring mat (6) directed towards the seat foam; and/or
- at least one assembly (14) of at least two seat occupancy sensor elements according to claim 9, the base members of which are mounted to at least one shaped spring (8, 10), in particular by means of a connecting bridge (20) that is hooked to at least one shaped spring (8, 10) or positively surrounds the shaped spring (8, 10), with the slidable members (56) being arranged such that the force application sides (58) of the same are arranged on the side of the spring mat (6) directed towards the seat foam.

* * * * *

UNITED STATES PATENT AND TRADEMARK OFFICE
CERTIFICATE OF CORRECTION

| | | |
|---|---|---|
| PATENT NO. | : 8,698,643 B2 | Page 1 of 7 |
| APPLICATION NO. | : 13/659560 | |
| DATED | : April 15, 2014 | |
| INVENTOR(S) | : Marco Schmitt et al. | |

It is certified that error appears in the above-identified patent and that said Letters Patent is hereby corrected as shown below:

> The Title page, showing the illustrative figure, should be deleted and substitute therefor the attached Title page.
> Please replace FIGS. 1-5 with FIGS. 1-5 as shown on the attached pages.

Signed and Sealed this
Ninth Day of February, 2016

Michelle K. Lee
*Director of the United States Patent and Trademark Office*

(12) United States Patent
Schmitt et al.

(10) Patent No.: US 8,698,643 B2
(45) Date of Patent: Apr. 15, 2014

(54) SENSOR ELEMENT, IN PARTICULAR SEAT OCCUPANCY DETECTION SENSOR ELEMENT

(71) Applicants: SCHERDEL INNOTEC Forschungs- und Entwicklungs-GmbH, Marktredwitz (DE); Forschungs- und Transferzentrum Leipzig e.V. an der HTWK Leipzig, Leipzig (DE)

(72) Inventors: Marco Schmitt, Kulmbach (DE); Jan Seitenglanz, Marienberg (DE); Thomas Fiedler, Grossrueckerswalde-Mauersberg (DE); Gisela Barthold, Hohenberg (DE); Hans-Martin Rambold, Marktredwitz (DE); Fabian Wiessner, Leipzig (DE); Michael Eiserbeck, Leipzig (DE)

(73) Assignees: SCHERDEL INNOTEC Forschungs-und Entwicklungs-GmbH, Marktredwitz (DE); Forschungs-und Transferzentrum Leipzig e.V. an der HTWK Leipzig, Leipzig (DE)

( * ) Notice: Subject to any disclaimer, the term of this patent is extended or adjusted under 35 U.S.C. 154(b) by 0 days.

(21) Appl. No.: 13/659,560

(22) Filed: Oct. 24, 2012

(65) Prior Publication Data
US 2013/0119728 A1 May 16, 2013

(30) Foreign Application Priority Data
Oct. 26, 2011 (DE) .................. 10 2011 085 263

(51) Int. Cl.
*B60K 28/00* (2006.01)
*G08B 21/00* (2006.01)

(52) U.S. Cl.
USPC ............................ 340/667; 180/273

(58) Field of Classification Search
USPC ............ 73/862.473; 180/273; 340/665–668, 340/425.5; 702/150, 173
See application file for complete search history.

(56) References Cited

U.S. PATENT DOCUMENTS
2004/0263154 A1 12/2004 Young et al.

FOREIGN PATENT DOCUMENTS
DE 19959276 A1 6/2001
DE 102004031143 4/2005

OTHER PUBLICATIONS
English Language Abstract of DE19959276 (A1), 1 page.

*Primary Examiner* — Brian Zimmerman
*Assistant Examiner* — Thomas McCormack

(57) ABSTRACT

Seat-occupancy-detection-sensor-element featuring double-body/compression/spring (DBCS) in a recess of a base-member (BM), and slidable-member (SM) having a force-application-side (FAS) and inside facing the BM; measuring-coil (MC) arranged in the recess and surrounded by the DBCS and having wound-coil-wire (WCW); and current-generating/measuring/evaluating-unit (CGMEU) connected to the WCW; the DBCW abutting the BM on one side and being fixed to the SM on the side of the SM compressed by a force on the FAS, from a spring length either uncompressed or compressed by a predetermined extent, spring wire ends connected and electrically forming a spring-coil (SC); MC and SC coils constituting an inductively-coupled coil assembly (ICCA); and the CGMEU applying AC to the MC inducing AC in the DBCS, measuring voltage on the MC proportional to the ICCA's impedance, and ascertaining force on the SM's FAS.

19 Claims, 5 Drawing Sheets